US012713490B2

(12) United States Patent
Wu

(10) Patent No.: US 12,713,490 B2
(45) Date of Patent: Aug. 18, 2026

(54) RESUMING RADIO CONNECTIONS IN A COMMUNICATION NETWORK

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 427 days.

(21) Appl. No.: 17/431,072

(22) PCT Filed: Feb. 13, 2020

(86) PCT No.: PCT/US2020/018077

§ 371 (c)(1),
(2) Date: Aug. 13, 2021

(87) PCT Pub. No.: WO2020/168055

PCT Pub. Date: Aug. 20, 2020

(65) Prior Publication Data

US 2022/0141914 A1 May 5, 2022

Related U.S. Application Data

(60) Provisional application No. 62/805,829, filed on Feb. 14, 2019.

(51) Int. Cl.
*H04W 76/25* (2018.01)
*H04W 76/19* (2018.01)
*H04W 76/27* (2018.01)

(52) U.S. Cl.
CPC .......... *H04W 76/25* (2018.02); *H04W 76/19* (2018.02); *H04W 76/27* (2018.02)

(58) Field of Classification Search
CPC ..... H04W 36/00; H04W 36/30; H04W 76/16; H04W 74/08; H04W 76/18; H04W 80/02
See application file for complete search history.

(56) References Cited

U.S. PATENT DOCUMENTS 8,559,387 B2 10/2013 Dwyer et al.
2011/0165875 A1 7/2011 Wu
(Continued)

FOREIGN PATENT DOCUMENTS

CN 105230053 A 1/2016
CN 106134277 A 11/2016
(Continued)

OTHER PUBLICATIONS

"5G; NG-RAN; Architecture Description (3GPP TS 38.401 version 15.2.0 Release 15)," 3GPP (Jul. 2018).
(Continued)

*Primary Examiner* — Iqbal Zaidi
(74) *Attorney, Agent, or Firm* — MARSHALL, GERSTEIN & BORUN LLP

(57) ABSTRACT

To resume a connection with a base station, a user equipment (UE) communicates messages with the base station in accordance with a format that corresponds to a first radio access technology (RAT), using a radio connection over a radio interface that conforms to a second RAT (702). The UE suspends the radio connection (704) and, subsequently to the suspending, transmits to the base station an indication that the radio connection has been resumed, in accordance with the format that corresponds to the first RAT (708).

18 Claims, 9 Drawing Sheets

(56) References Cited

U.S. PATENT DOCUMENTS

| | | | | |
|---|---|---|---|---|
| 2017/0311290 | A1 | 10/2017 | Adjakple et al. | |
| 2018/0139778 | A1 | 5/2018 | Chou et al. | |
| 2018/0234941 | A1 | 8/2018 | Kim et al. | |
| 2019/0037635 | A1 | 1/2019 | Guo et al. | |
| 2019/0045568 | A1 | 2/2019 | Palat et al. | |
| 2021/0022198 | A1* | 1/2021 | Wang | H04W 76/19 |
| 2021/0266811 | A1* | 8/2021 | Hwang | H04W 28/06 |
| 2021/0410216 | A1* | 12/2021 | Liu | H04W 76/20 |
| 2022/0022285 | A1 | 1/2022 | Dowlatkhah | |
| 2022/0046497 | A1 | 2/2022 | Wang et al. | |
| 2022/0141914 | A1 | 5/2022 | Wu | |

FOREIGN PATENT DOCUMENTS

| | | | |
|---|---|---|---|
| CN | 107211360 | A | 9/2017 |
| CN | 107995688 | A | 5/2018 |
| CN | 108140944 | A | 6/2018 |
| CN | 108271227 | A | 7/2018 |
| CN | 108605376 | A | 9/2018 |
| CN | 108616880 | A | 10/2018 |
| CN | 108632922 | A | 10/2018 |
| CN | 108702732 | A | 10/2018 |
| CN | 109104745 | A | 12/2018 |
| CN | 109150432 | A | 1/2019 |
| CN | 109151870 | A | 1/2019 |
| TW | 201811097 | A | 3/2018 |
| WO | WO-2010/080912 | A2 | 7/2010 |
| WO | WO-2014/000650 | A1 | 1/2014 |
| WO | WO-2016/028461 | A1 | 2/2016 |
| WO | WO-2017/188758 | A1 | 11/2017 |
| WO | WO-2018/050958 | A1 | 3/2018 |
| WO | WO-2018/119119 | A1 | 6/2018 |
| WO | WO-2018/175809 | A1 | 9/2018 |
| WO | WO-2018/232108 | A1 | 12/2018 |

OTHER PUBLICATIONS

"5G; NR; Packet Data Convergence Protocol (PDCP) Specification (3GPP TS 38.323 version 15.2.0 Release 15)," 3GPP Draft (Sep. 2018).

First Examination Report for India Application No. 202147038839, dated Mar. 15, 2022.

CATT, "NR PDCP Reconfiguration for SRB1," 3GPP (2018).

Huawei et al., "NR PDCP for MCG SRBs and MCG Bearer in ENDC," 3GPP (2017).

International Search Report and Written Opinion for Application No. PCT/US2020/018077, dated Jun. 5, 2020.

Office Action for Taiwan Application No. 109104668, dated Jan. 2021.

OPPO, "Discussion on PDCP Version Configuration for Fallback Case in eLTE," 3GPP (2018).

Office Action for Chinese Patent Application No. 202080028919.5, dated Jun. 30, 2023.

"3rd Generation Partnership Project; Technical Specification Group Radio Access Network; Evolved Universal Terrestrial Radio Access (E-UTRA); Radio Resource Control (RRC); Protocol specification (Release 15)", 3GPP Draft (2018).

Office Action for European Application No. 20711406.7, dated Feb. 12, 2026.

Notice of Preliminary Rejection for Korean Application No. 10-2021-7027305, dated Jun. 2, 2026.

* cited by examiner

RESUMING RADIO CONNECTIONS IN A COMMUNICATION NETWORK

FIELD OF THE DISCLOSURE

This disclosure relates generally to wireless communications and, more particularly, to procedures for resuming radio connections.

BACKGROUND

According to some types of network architecture, a base station communicates with a user equipment (UE) using a certain radio access technology (RAT), and connects to a more advanced core network (CN) to provide the UE with the functionality of the more advanced CN.

For example, a next-generation evolved Node B eNB (ng-eNB) supports Evolved Universal Terrestrial Radio Access (EUTRA) and connects to a 5G core (5GC). In this case, the physical layer (PHY) of EUTRA provides transport channels to the Medium Access Control (MAC) sublayer, which in turn provides logical channels to the Radio Link Control (RLC) sublayer, and the RLC sublayer in turn provides RLC channels to the Packet Data Convergence Protocol (PDCP) sublayer. To support connection to a 5GC, a EUTRA PDCP sublayer provides signaling radio bearers (SRBs) to the Radio Resource Control (RRC) sublayer, and a New Radio (NR) PDCP sublayer provides data radio bearers (DRBs) to the Service Data Adaptation Protocol (SDAP) and SRBs to the RRC sublayer.

At the RRC sublayer, 4G and 5G standards in some cases support different functionality. For example, the 4G-LTE RRC protocol specified an RRC_IDLE state, in which a UE did not have an active radio connection with a base station, and an RRC_CONNECTED state, in which the UE had an active radio connection with the base station. The 5G protocol introduced an intermediate state, RRC_INACTIVE, to allow a UE to more quickly transition back to the RRC_CONNECTED state.

When the UE is in the RRC_INACTIVE state, the UE must transition to the RRC_CONNECTED state in order to start transmitting data in the uplink direction. To this end, the UE must perform the RRC resume procedure, which requires the UE to send an RRCConnectionResumeRequest message to the base station, receive an RRCConnectionResume command in response from the base station, and transmit an RRCConnectionResumeComplete message to the base station to confirm that the state transition is complete. In some cases, after the UE sends an RRCConnectionResumeRequest message to the base station, the base station follows the fallback procedure and transmits an RRCConnectionSetup command in response to the RRCConnectionResumeRequest message, and the UE transmits an RRCConnectionSetupComplete message to the base station to confirm that the state transition is complete.

Several specifications related to cellular communication provide protocols according to which a UE can transition between RRC states in networks of the type describe above (e.g., 3GPP TS 36.331 v 15.3.0, TS 36.323 v 15.1.0, TS 38.323 v 15.3.0, TS 38.331 v 15.3.0, and TS 36.300 v 15.3.0), but there remain anomalous situations when a UE transitions from the RRC_INACTIVE state to the RRC_CONNECTED state but remains incapable of transmitting or receiving data.

In one such situation, a UE operates in the RRC_CONNECTED state and communicates with an ng-eNB over EUTRA to exchange NR PDCP protocol data units (PDUs) with an RRC entity of the ng-eNB. After transitioning to the RRC_INACTIVE state, the UE at some point attempts to resume the connection to transmit uplink data, for example. To this end, the UE transmits an RRCConnectionResumeRequest message and receives the RRCConnectionSetup message in response. The UE then releases all radio resources, including the NR PDCP entity, and transmits an RRCConnectionSetupComplete message and includes this message in a EUTRA PDCP PDU.

As a result, the UE remains in the RRC_CONNECTED state but cannot transmit or receive any data.

SUMMARY

Generally speaking, the techniques of this disclosure allow the UE and the base station to properly decode messages related to the RRC resume procedure, when the PDCP entity that previously released the connection corresponds to a different RAT than the one the base station uses to communicate with the UE.

According to one technique, the UE transmits the RRC message reporting that the connection has been resumed successfully (an RRCConnectionSetupComplete message) to the ng-eNB using the same underlying protocol used prior to the release of the connection (e.g., NR PDCP). In one example implementation, the UE retains the same entity (e.g., the NR PDCP entity) that formats and transmits the RRC message. In another example implementation, the UE starts a new entity to format and transmit the RRC message. In either case, after the UE successfully resumes the RRC connection, the UE performs subsequent procedures (e.g., security mode, DL information, UL information, RRC reconfiguration, etc.) using the same format or protocol used for resuming the RRC connection.

According to another technique, the base station defaults to decoding the data unit carrying the RRC message reporting that a UE resumed a connection (a received RRCConnectionSetupComplete message) in accordance with the protocol corresponding to the RAT the base station uses to communicate with the UE (e.g., EUTRA PDCP). Thus, despite the format of any previous PDCP PDU exchanges, the UE transmits the RRC message reporting that the connection has been resumed successfully (an RRCConnectionSetupComplete message) to the ng-eNB using the protocol corresponding to the RAT. The UE performs subsequent procedures (e.g., security mode, DL information, UL information, RRC reconfiguration, etc.) using the same format or protocol used for resuming the RRC connection.

According to yet another technique, the base station decodes the data unit carrying the RRC message reporting that a UE resumed a connection (a received RRCConnectionSetupComplete message) in accordance with the protocol corresponding to the RAT the base station uses to communicate with the UE (e.g., EUTRA PDCP), similar to the approach above. However, the UE then performs subsequent procedures (e.g., security mode, DL information, UL information, RRC reconfiguration, etc.) using the same format used prior to releasing the RRC connection (e.g., NR PDCP).

One example embodiment of these techniques is a method in a UE for resuming a connection with a base station. The method can be executed by processing hardware and comprises communicating messages with the base station in accordance with a format that corresponds to a first RAT, using a radio connection over a radio interface that conforms to a second RAT. The method further comprises suspending the radio connection and, subsequently to the suspending, transmitting to the base station an indication that the radio connection has been resumed, in accordance with the format that corresponds to the first RAT.

Another example embodiment of these techniques is a method in a UE for resuming a connection with a base station. The method can be executed by processing hardware and comprises communicating first messages with the base station in accordance with a first format that corresponds to a first RAT, using a radio connection over a radio interface that conforms to a second RAT. The method further comprises suspending the radio connection and, subsequently to the suspending, transmitting to the base station an indication that the radio connection has been resumed, in accordance with a second format that corresponds to the second RAT, and communicating second messages related to a procedure for controlling radio resources, in accordance with the first format or the second format.

Yet another example embodiment of these techniques is a UE comprising processing hardware configured to execute one of the methods above.

Still another example embodiment of these techniques is a method in a base station for resuming a connection with a UE. The method comprises communicating messages with the UE in accordance with a format that corresponds to a first RAT, using a radio connection over a radio interface that conforms to a second RAT. The method further comprises transmitting to a UE a command to suspend the radio connection; subsequently to the transmitting, receiving from the UE, an indication that the connection has been resumed, and decoding the indication in accordance with the format that corresponds to the first RAT.

Still another example embodiment of these techniques is a base station comprising processing hardware configured to execute one of the methods above.

DETAILED DESCRIPTION OF THE DRAWINGS

Figure 1:
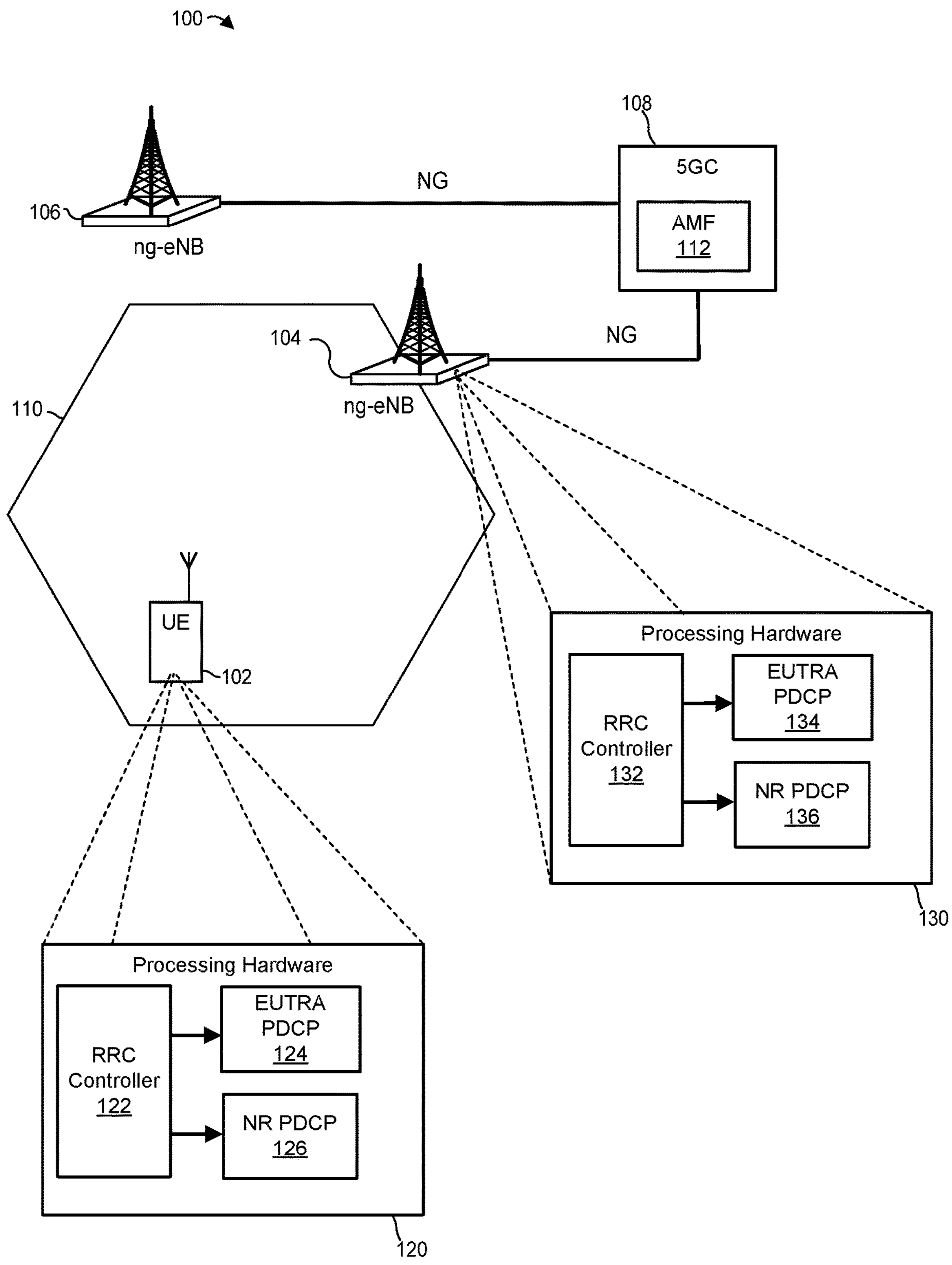
FIG. 1 is a block diagram of an example wireless communication network in which a UE and a base station properly decode messages related to a procedure for resuming a radio connection, using the techniques of this disclosure.

FIG. 1 depicts an example wireless communication network 100 in which an example UE 102 communicates with a base station of an enhanced long term evolution (eLTE) network, an ng-eNB 104. The UE 102 and ng-eNB 104 communicate via the EUTRA RAT in a cell 110. The ng-eNB 104 in turn communicates with a 5GC 108 via a Next Generation (NG) interface. The UE 102 thus can access the functionality of the 5GC 108, including an Access Management Function (AMF) 112. The eLTE network also can include an ng-eNB 106.

In accordance with the techniques of this disclosure, the UE 102 and the ng-eNB 104 exchange RRC messages using the NR PDCP format and/or the EUTRA PDCP format, in a manner than allows both devices to decode the RRC messages. Although these techniques are discussed below with example reference to EUTRA, NR, and 5GC, generally similar techniques can apply to other radio access and/or core network technologies.

As illustrated in FIG. 1, the UE 102 is equipped with processing hardware 120 that can include one or more general-purpose processors such as central processing units (CPUs) and non-transitory computer-readable memory storing machine-readable instructions executable on the one or more general-purpose processors, and/or special-purpose processing units. The processing hardware 120 in an example implementation includes an RRC controller 122 that can instantiate, release, and otherwise interact with, a EUTRA PDCP entity 124 and an NR PDCP entity 126.

The ng-eNB 104 is equipped with processing hardware 130 that also can include one or more general-purpose processors such as CPUs and non-transitory computer-readable memory storing machine-readable instructions executable on the one or more general-purpose processors, and/or special-purpose processing units. The processing hardware 130 includes an RRC controller 132 that can interact with a EUTRA PDCP entity 134 and an NR PPCP entity 136, similar to the RRC controller 122 of the UE 102.

In some implementations, the RRC controller 132 can operate outside the ng-eNB 104 in another component of the eLTE network. For convenience, however, the discussion below refers to the RRC controller 132 operating in the ng-eNB 104. When the RRC controller 132 operates outside the ng-eNB 104, the interactions between the RRC controller 132, the EUTRA PDCP entity 134, the NR PDCP entity 136, as well components of the UE 102 are similar to those discussed below.

In some scenarios, the UE 102 and the ng-eNB 104 exchange data in accordance with the NR PDCP format and, after a period of inactivity for example, the UE 102 transitions to the RRC_INACTIVE state. When the UE 102 transitions from the RRC_INACTIVE state to the RRC-_CONNECTED state, the UE 102 can transmit the RRC-ConnectionSetupComplete message using the ETRA PDCP format or the NR PDCP format, and the ng-eNB 104 can decode this message using the EUTRA PDCP entity 134 or the NR PDCP entity 136, respectively. The UE 102 and the ng-eNB 104 also can perform another RRC procedure using the EUTRA PDCP entities 124, 134 or the NR PDCP entities 126, 136.

For clarity, prior to discussing these scenarios in more detail with reference to FIGS. 3-6, an example user plane protocol stack according to which the UE 102 and the ng-eNB 104 can communicate is discussed with reference to FIG. 2A, and the control plane protocol stack is discussed with reference to FIG. 2B.

Figure 2A:
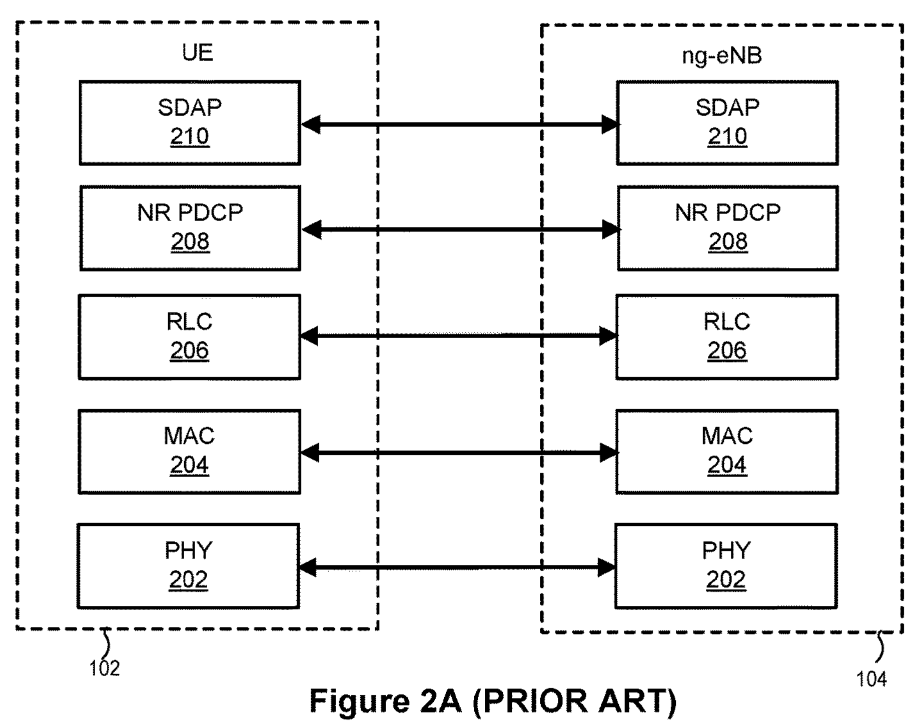
FIG. 2A is a block diagram of a user plane protocol stack in accordance with which the UE and the base station of FIG. 1 can communicate.

Referring first to FIG. 2A, the processing hardware 120 of the UE 102 and the processing hardware 130 of the ng-eNB 104 can support a PHY sublayer 202, a MAC sublayer 204 layered over the PHY sublayer 202, and an RLC sublayer 206 layered over the MAC sublayer 204. The NR PDCP entities 126 and 136 can layer NR PDCP data units at a sublayer 208 over the RLC sublayer 206. The NR PDCP data units can carry information at the SDAP sublayer 210, for example.

Figure 2B:
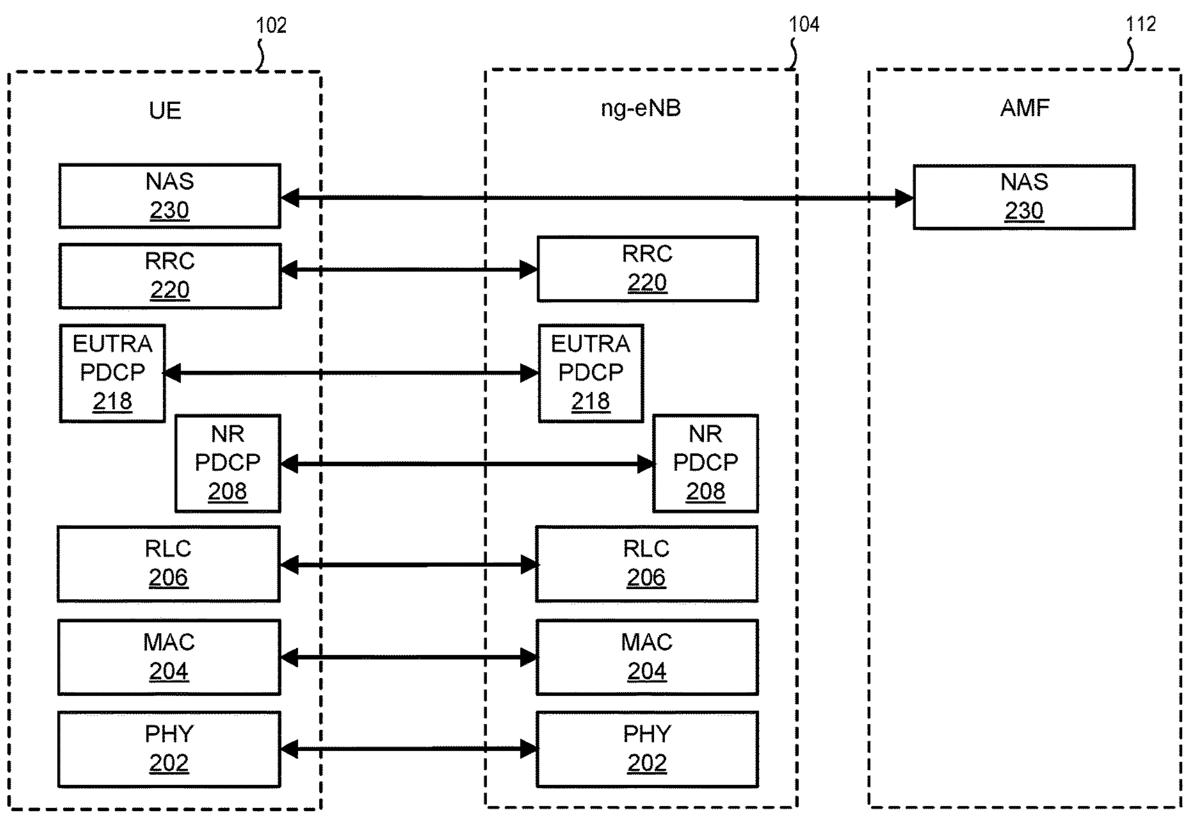
FIG. 2B is a block diagram of a control plane protocol stack in accordance with which the UE and the base station of FIG. 1 can communicate.

As illustrated in FIG. 2B, the processing hardware 120 and the processing hardware 130 similarly use the sublayers 202, 204, 206 to support communications on the control plane. The RLC sublayer 206 can support both the NR PDCP sublayer 208 and a EUTRA PDCP sublayer 218. Thus, both the NR PDCP entities 126, 136 and the EUTRA PDCP entities 124, 134 can layer data units over the RLC sublayer 206.

As further illustrated in FIG. 2B, the UE 102 and the ng-eNB 104 can transmit RRC messages at a sublayer 220 over the NR PDCP sublayer 208 or the EUTRA PDCP sublayer 218. Further, the UE 102 can exchange non-access stratum (NAS) information with the AMF 112 at a NAS sublayer 230.

Figure 3:
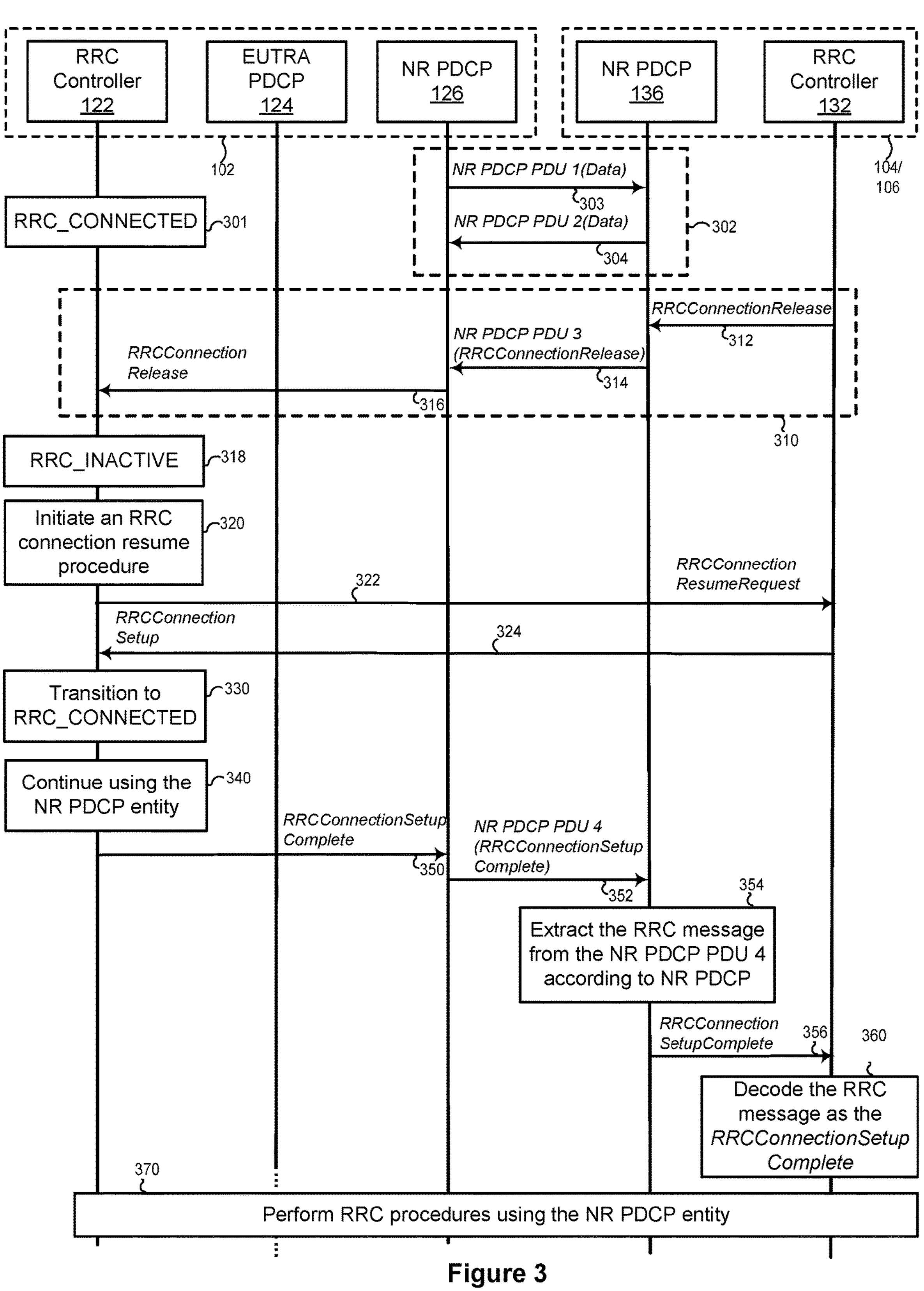
FIG. 3 is a messaging diagram of an example scenario in which a UE exchanges NR PDCP PDUs with an ng-eNB in the RRC_CONNECTED state and, upon subsequently transitioning from the RRC_INACTIVE state to the RRC_CONNECTED state, transmits an RRCConnectionSetupComplete message using an NR PDCP PDU.

Next, FIG. 3 illustrates an example scenario in which the UE 102 initially exchanges 302 NR PDCP PDUs with the ng-eNB 104, in the RRC_CONNECTED state 301. For example, the NR PDCP entity 126 can transmit 303 NR PDCP PDU 1 to the NR PDCP entity 136 and receive 304 NR PDCP PDU 2 from the NR PDCP entity 136. Each of the NR PDCP PDUs 303, 304, etc. can include for example an Internet Protocol (IP) packet, a NAS message, or an RRC message.

After a certain period of data inactivity of the UE 102, the ng-eNB 104 (or another component of the eLTE network in which the ng-eNB 104 operates) determines that the RRC (or radio) connection between the UE 102 and the ng-eNB 104 should be suspended. The ng-eNB 104 then initiates a connection release procedure 310 to suspend the RRC (or radio) connection. In particular, the RRC controller 132 provides 312 an RRCConnectionRelease message to the NR PDCP entity 136, and the NR PDCP entity 136 transmits 314 the RRCConnectionRelease message in an NR PDCP PDU 3, over the EUTRA radio interface to suspend the RRC (or radio connection).

The NR PDCP entity 126 of the UE 102 receives the NR PDCP PDU 3, extracts the RRCConnectionRelease message, and provides the RRCConnectionRelease message to the RRC controller 122. In response, the RRC controller 122 transitions to the RRC_INACTIVE state 318 (i.e., suspending the RRC (or radio) connection).

At a later time, the RRC controller 122 initiates 320 an RRC connection resume procedure. For example, the RRC controller 122 can receive an indication from a higher layer (e.g., the SDAP sublayer 210) that the UE 102 needs to transmit data to the ng-eNB 104. The RRC controller 122 transmits 322 an RRCConnectionResumeRequest message to the eLTE network in which the ng-eNB 104 operates. In this example scenario, the RRC controller 122 transmits the RRCConnectionResumeRequest message to the ng-eNB 104, but in other scenarios the RRC controller 122 can transmit this message to the ng-eNB 106. In response, the RRC controller 132 transmits 324 an RRCConnectionSetup message to the UE 102.

In the scenario of FIG. 3, the UE 102 continues to use the same NR PDCP entity 126 the UE 102 used for the exchange 302 to communicate with the ng-eNB 104 after transitioning from the RRC_INACTIVE state to the RRC_CONNECTED state. More specifically, the UE 102 can establish the NR PDCP entity 126 for an SRB (e.g., SRB1) prior to, or at the time of, the exchange 302 with the NR PDCP entity 136. After the UE 102 receives 324 the RRCConnectionRelease message from the ng-eNB 104, the UE 102 does not release the NR PDCP entity 126. Thus, after the UE 102 receives 324 the RRCConnectionSetup message from the ng-eNB 104 (or the ng-eNB 106), the UE 102 does not establish a new NR PDCP entity. The UE 102 uses the previously established NR PDCP entity 126 to transmit 352 the RRC-ConnectionSetupComplete message to the ng-eNB 104 (or the ng-eNB 106). However, in other implementations discussed below, the UE 102 can release or suspend the NR PDCP entity 126 under some circumstances, and create a new NR PDCP entity or resume the suspended NR PDCP entity 126 in response to certain events. The UE 102 may reestablish the NR PDCP entity 126 before receiving the RRConnectionSetup message or before transmitting the RRCConnectionSetupComplete message.

Similarly, the ng-eNB 104 can use the previously established NR PDCP entity 136 to receive 352 the RRCConnectionSetupComplete message from the UE 102. However, in other implementations discussed below, the ng-eNB 104 can release or suspend the NR PDCP entity 136 under some circumstances, and create a new NR PDCP entity or resume the suspended NR PDCP entity 136 in response to certain events. In the case of using the NR PDCP entity 136, the ng-eNB 104 may reestablish the NR PDCP entity 136 before receiving the RRCConnectionSetupComplete message. In the case of releasing the NR PDCP entity 136, the ng-eNB 106 establishes a new instance of the NR PDCP entity 136 to receive the RRCConnectionSetupComplete message.

The RRC controller 122 transitions 330 to the RRC_CONNECTED state. In this example, the RRC controller 122 continues to utilize 340 the NR PDCP entity 126 which exchanged NR PDCP PDUs with the NR PDCP entity 136 or the new NR PDCP entity of the ng-eNB 104 (or the new NR PDCP entity of the ng-eNB 106) prior to the release of the RRC connection. In particular, the RRC controller 122 provides 350 an RRCConnectionSetupComplete message to the NR PDCP entity 126, which then includes the RRCConnectionSetupComplete message in an NR PDCP PDU 4 and transmits 352 this NR PDCP PDU to the NR PDCP entity 136 or the new NR PDCP entity of the ng-eNB 104 (or the new NR PDCP entity of the ng-eNB 106). In some implementations, the UE 102 releases radio resources configured by the ng-eNB 104 before receiving the RRCConnectionRelease message. The radio resources may include EUTRA RLC entities, NR SDAP entities (if configured), and other NR PDCP entities (except the NR PDCP entity 126).

With continued reference to FIG. 3, the NR PDCP entity 136 decodes the NR PDCP PDU 4 using the format of NR PDCP to extract 354 the RRCConnectionSetupComplete message. Thus, both the UE 102 and the ng-eNB 104 (or the ng-eNB 106) in this implementation use the NR PDCP format to communicate the RRCConnectionSetupComplete message. The UE 102 in this implementation does not utilize the EUTRA PDCP entity 124 to resume the RRC connection (or to conduct subsequent RRC procedures, as discussed below), even though the UE 102 and the ng-eNB 104 (or the ng-eNB 106) communicate over EUTRA.

In contrast to the techniques of FIG. 3, an existing ng-eNB can attempt to decode the NR PDCP PDU 4 using the format of EUTRA PDCP (because this PDU arrives over the EUTRA interface), and the decoding fails in this case because the PDCP SN according to the EUTRA PDCP PDU format includes 5 bits and PDCP SN according to the NR PDCP PDU format has 12 bits, for example. Moreover, after the existing ng-eNB fails to decode the RRCConnectionSetupComplete message, the ng-eNB transmits an RRCConnectionRelease message to the UE in an NR PDCP PDU. Because the UE expects a EUTRA PDCP PDU, the UE also fails to decode the message. Thus, the UE is not aware that the ng-eNB has released the RRC connection.

After the NR PDCP entity 136 extracts the RRCConnectionSetupComplete message, the NR PDCP entity 136 provides 356 the RRCConnectionSetupComplete message to the RRC controller 132, which decodes 360 the content of this RRC message.

As further illustrated in FIG. 3, the UE 102 and the ng-eNB 104 can perform 370 a subsequent RRC procedure using the NR PDCP format to transmit and receive RRC messages. For example, the UE 102 and the ng-eNB 104 can perform one or more of an RRC security mode procedure, a downlink (DL) information procedure, an uplink (UL) information procedure, an RRC reconfiguration procedure, or a measurement reporting procedure.

More specifically, when performing the security mode procedure, the ng-eNB 104 transmits a Security Mode Command message to the UE 102 and receives s Security Mode Complete message from the UE 102. During the DL information procedure, the ng-eNB 104 transmits a DL Information message to the UE 102. On the other hand, during the UL information procedure, the UE 102 transmits an UL Information message to the ng-eNB 104. During the RRC connection reconfiguration procedure, the ng-eNB 104 transmits an RRC Connection Reconfiguration message to the UE 102 and receives an RRC Connection Reconfiguration Complete message from the UE 102. Finally, as a part of the measurement reporting procedure, the UE 102 transmits a Measurement Report message to the ng-eNB 104.

Referring back to the event 352, the UE 102 in some implementations sets the sequence number (SN) to zero in the PDCP header of the NR PDCP PDU 4.

In other implementations, the UE 102 assigns an initial value (e.g., zero) to the transmit count variable (TX_COUNT), in response to an event that conceptually separates the exchange 302 from the subsequent communication of NR PDCP PDUs. This event can be, for example, the receiving of the RRCConnectionRelease message, the initiation of the RRC connection resume procedure, the transmission of the RRCConnectionResumeRequest message to the ng-eNB 104, or the receiving of the RRCConnectionSetup message. The UE 102 then uses the TX_COUNT to transmit NR PDCP PDUs that include RRC messages.

In some implementations, the UE 102 uses the TX_COUNT to generate a message authentication code for integrity (MAC-I) of an RRC PDU including the RRCConnectionSetupComplete message, if integrity protection is configured in the RRCConnectionSetup message. The UE 102 can encrypt a PDCP service data unit (SDU) including the RRC PDU and a message authentication code for the MAC-I of the RRC PDU using the TX_COUNT, if encryption is configured in the RRCConnectionSetup message. The UE 102 in this implementation includes the encrypted PDCP SDU in the NR PDCP PDU 4 and sets the SN in the PDCP PDU header of the NR PDCP PDU 4 to a certain number (X) of least significant bits (LSBs) of the TX_COUNT. The value of X can be the length of the SN, for example. The UE 102 then increment the TX_COUNT value by one after encrypting the PDCP SDU or generating the NR PDCP PDU 4. In other implementations, if neither integrity protection nor encryption is configured in the RRCConnectionSetup message, the UE 102 still generates a MAC-I of an RRC PDU including the RRCConnectionSetupComplete message and sets the MAC-I to a default value (e.g., 0). The UE 102 in this implementation generates a PDCP SDU to include the RRC PDU and the MAC-I, includes the PDCP SDU in the NR PDCP PDU 4, and sets the SN in the PDCP PDU header of the NR PDCP PDU 4 to a certain number (X) of least significant bits (LSBs) of the TX_COUNT.

Further, when the UE 102 needs to transmit the first RRC message after transmitting the RRCConnectionSetupComplete message or after receiving a SecurityModeCommand message from the ng-eNB 104 (or the ng-eNB 106), the UE 102 in one implementation uses the TX_COUNT to encrypt the PDCP SDU including an RRC PDU including the first RRC message and including a MAC-I of the RRC PDU. The UE 102 then includes the encrypted PDCP SDU in NR PDCP PDU 5. The UE 102 then sets the SN in the PDCP PDU header of the NR PDCP PDU 5 to the certain number of LSBs of the TX_COUNT. The UE 102 transmits the NR PDCP PDU 5 to the ng-eNB 104 (or the ng-eNB 106). The UE 102 also increments the TX_COUNT by one after encrypting the PDCP SDU or generating the NR PDCP PDU 5. The UE 102 can transmit each of the subsequent RRC messages in a similar manner.

Still further, the UE 102 in some implementations assigns an initial value (e.g., zero) to a receive count variable (RX_COUNT), in response to the same or similar event as discussed above with reference to the TX_COUNT. The UE 102 then uses the RX_COUNT to process NR PDCP PDUs received from the ng-eNB 104 (or the ng-eNB 106). For example, the UE uses the RX_COUNT to decrypt a NR PDCP SDU in a received NR PDCP PDU and/or perform integrity check on an RRC PDU in the NR PDCP SDU). The UE 102 in some implementations increments the RX_COUNT value by one after processing each of the NR PDCP PDUs. In one example scenario, each of the NR PDCP PDUs is a PDCP Data PDU.

Figure 4:
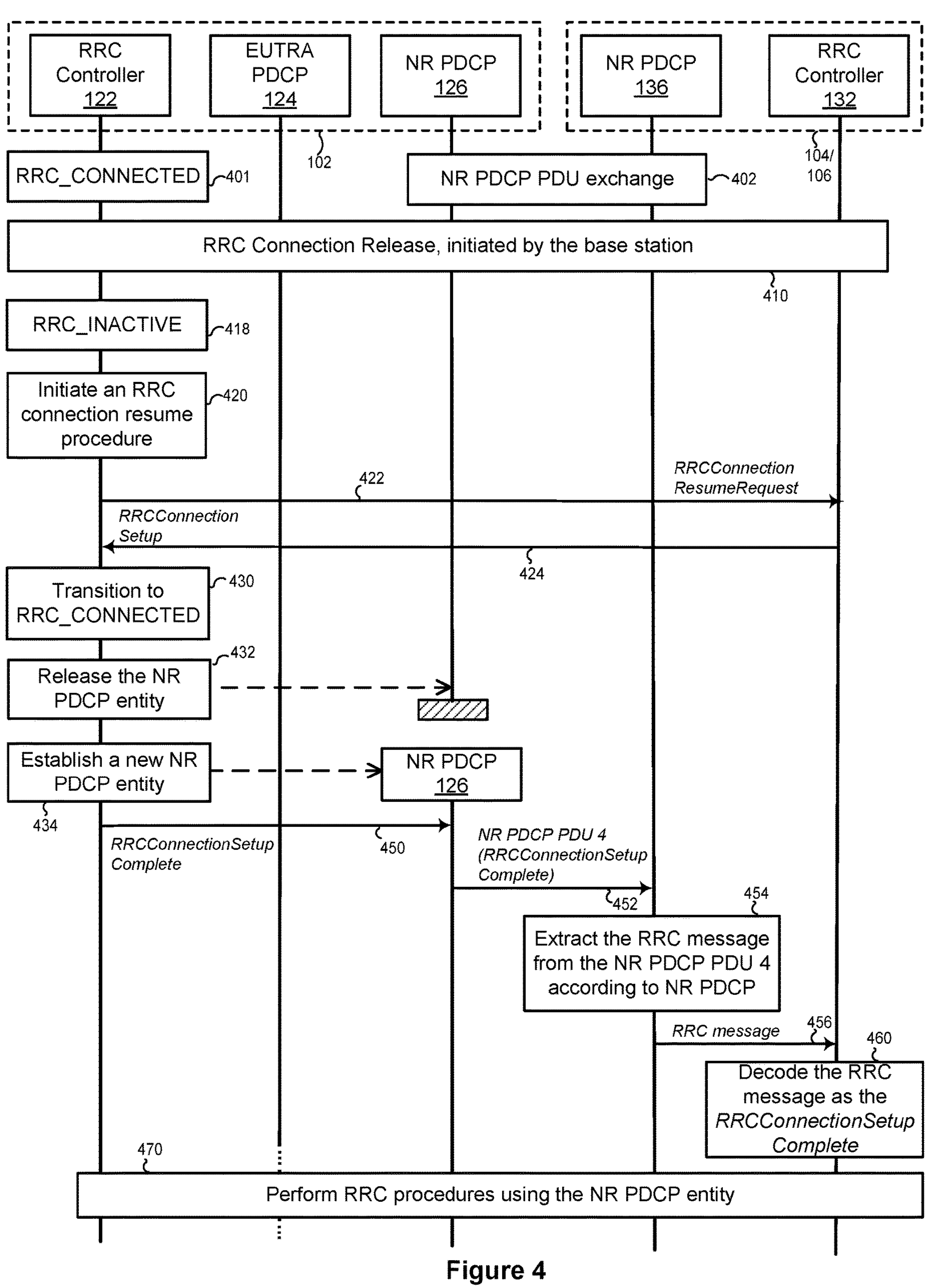
FIG. 4 is a messaging diagram of a scenario similar to the scenario of FIG. 3, in which the UE restarts the NR PDCP entity after transitioning back to the RRC_CONNECTED state.

Now referring to FIG. 4, the RRC controller 122 or another suitable component of the UE 102 in this scenario establishes a new instance of the NR PDCP entity 126 after transitioning to the RRC_CONNECTED state, so that different instances of the NR PDCP entity 126 are involved in the exchange 302 and the transmission of the RRCConnectionSetupComplete message (as well as the subsequent RRC messages).

In this scenario, the UE 102 initially is in the RRC_CONNECTED state 401, and the ng-eNB 104 exchange 402 NR PDCP PDUs, similar to the exchange 302 discussed above. The ng-eNB 104 then performs a connection release procedure 410, which is similar to the procedure 310. The UE 102 then transitions 418 to the RRC_INACTIVE state, subsequently initiates 420 an RRC connection resume procedure, transmits 422 an RRCConnectionResumeRequest message to the eLTE network in which the ng-eNB 104 (or the ng-eNB 106) operates, receives 424 an RRCConnectionSetup message, and transitions 430 to the RRC_CONNECTED state (similar to the events 318, 320, 322, and 324 discussed above).

As illustrated in FIG. 4, the RRC controller 122 releases 432 the NR PDCP entity 126 and establishes 434 a new instance of the NR PDCP entity 126, prior to transmitting 452 the RRCConnectionSetupComplete message to the ng-eNB 104. The UE 102 can apply a default NR PDCP configuration to NR PDCP entity 126, at the time of creating the instance of the NR PDCP entity 126 or when transmitting 452 the RRCConnectionSetupComplete message. In some implementations, the UE 102 releases radio resources (e.g., for all established RBs except SRB0) configured by the ng-eNB 104 before receiving the RRCConnectionRelease message. The radio resources may include EUTRA RLC entities, NR SDAP entities (if configured), and other NR PDCP entities.

The new instance of the NR PDCP entity 126 transmits 452 an NR PDCP PDU including the RRCConnectionSetupComplete message to the ng-eNB 104. The subsequent events 454, 456, 460, and 470 are similar to the events 354, 356, 360, and 370 discussed above.

Referring generally to FIGS. 3 and 4, the RRC controller 122 in other implementations can establish, reestablish (i.e., apply new configuration), and release instances of the NR PDCP entity 126 in response to different events.

For example, the UE 102 can establish the NR PDCP entity 126 prior, or in response, to receiving 312 the RRCConnectionRelease message from the ng-eNB 104. When the UE 102 establishes the NR PDCP entity 126 before receiving 312 the RRCConnectionRelease message, the UE 102 receives 314 the NR PDCP PDU 3 and extracts the RRCConnectionRelease message from the NR PDCP PDU 3, using the NR PDCP entity 126. The UE 102 can apply the default NR PDCP configuration for the NR PDCP entity 126 (referring to the NR PDCP entity 126 or the new instance of the NR PDCP entity 126 described above) in response to the RRCConnectionRelease message or before transmitting 352, 452 the RRCConnectionSetupComplete message to the ng-eNB 104 (or the ng-eNB 106). The UE 102 then can reestablish the NR PDCP entity 126 before transmitting 352, 452 the RRCConnectionSetupComplete message, e.g., in response to the RRCConnectionRelease message (event 314), in response to initiating 320, 420 the RRC connection resume procedure, in response to the RRCConnectionSetup message (events 324, 424), or in response to transmitting the 352, 452 RRCConnectionSetupComplete message to the ng-eNB 104 (or the ng-eNB 106).

In some cases, if the RRCConnectionSetup message includes a NR PDCP configuration (e.g., a PDCP-Config information element) for a SRB1 used by the UE 102 to transmit the RRCConnectionSetupComplete message, the UE 102 applies the NR PDCP configuration to the NR PDCP entity 126. For example, the RRCConnectionSetup message includes an SRB-ToAddMod information element for the SRB1 and the SRB-ToAddMod information element includes the NR PDCP configuration. In another example, the RRCConnectionSetup message does not include a NR PDCP configuration.

If the RRCConnectionSetup message includes an RLC configuration (e.g., a RLC-Config information element) for the SRB1, the UE 102 may establish an EUTRA RLC entity (or called a RLC bearer) in accordance with the RLC configuration and associate the EUTRA RLC entity with the NR PDCP entity 126. Then the NR PDCP entity 126 transmits the 354, 454 NR PDCP PDU 4 via the EUTRA RLC entity.

The ng-eNB 104 (or the ng-eNB 106) can apply a default NR PDCP configuration to the NR PDCP entity 136 (referring to the NR PDCP entity 136 or the new instance of the NR PDCP entity 136 described above) before receiving the RRCConnectionSetupComplete message. The default NR PDCP configurations applied by the UE and the ng-eNB 104 (or the ng-eNB 106) may be same or different. In one example, the ng-eNB 104 (or the ng-eNB 106) can include a NR PDCP configuration (e.g., a PDCP-Config information element) for the SRB1 in the RRCConnectionSetup message. The ng-eNB 104 (or the ng-eNB 106) may apply the NR PDCP configuration to the NR PDCP entity 136. For example, the ng-eNB 104 (or the ng-eNB 106) includes the NR PDCP configuration in an SRB-ToAddMod information element for the SRB1 and includes the in the RRCConnectionSetup message. In another example, the ng-eNB 104 (or the ng-eNB 106) does not include a NR PDCP configuration in the RRCConnectionSetup message.

The ng-eNB 104 (or the ng-eNB 106) may include an RLC configuration (e.g., a RLC-Config information element) for the SRB1 in the RRCConnectionSetup message. The ng-eNB 104 (or the ng-eNB 106) may establish an EUTRA RLC entity (or an RLC bearer) in accordance with the RLC configuration and associate the EUTRA RLC entity with the NR PDCP entity 136. PDCP entity 136 receives the 354, 454 NR PDCP PDU 4 via the EUTRA RLC entity. Alternatively, the ng-eNB 104 (or the ng-eNB 106) may establish an EUTRA RLC entity (or an RLC bearer) in accordance with a default RLC configuration different from the RLC configuration even the ng-eNB 104 (or the ng-eNB 106) includes the RLC configuration in the RRCConnectionSetup message. Then the NR PDCP entity 136 receives the 354, 454 NR PDCP PDU 4 via the EUTRA RLC entity.

As another example, the RRC controller 122 establishes the NR PDCP entity 126 before receiving 314 the RRCConnectionRelease message from the ng-eNB 104. The UE 102 receives the NR PDCP PDU 3 and extract the RRCConnectionRelease message from the NR PDCP PDU 3, using the NR PDCP entity 126. The RRC controller 122 in this implementation releases the NR PDCP entity 126 in response to the RRCConnectionRelease message.

On the side of the eLTE network (e.g., at the ng-eNB 104), the RRC controller 132 or another suitable component of the eLTE network also can use the same instance of the NR PDCP entity 136 for the SRB to communicate RRC messages, or alternatively reestablish the NR PDCP entity 136 when resuming the RRC connection. In a generally similar manner to the RRC controller 122 operating in the UE 102, the RRC controller 132 can release and establish instances of the NR PDCP entity 136 in response to various events such as messages received from the UE 102 or transmitted to the UE 102.

The RRC controller 132 for example can establish the NR PDCP entity 136 for an SRB (e.g., SRB1) prior to receiving 352, 452 the NR PDCP PDU 4. The ng-eNB 104 then can extract the RRCConnectionSetupComplete message from the NR PDCP PDU 4 using the NR PDCP entity 136. In one example implementation, the RRC controller 132 establishes the NR PDCP entity 136 in response to receiving 322, 422 the RRCConnectionResumeRequest message from the UE 102. In another example implementation, the RRC controller 132 establishes the NR PDCP entity 136 in response to transmitting 324 the RRCConnectionSetup message to the UE 102. The RRC controller 136 can apply the default NR PDCP configuration to the NR PDCP entity 136 at the time of establishing the NR PDCP entity 136 or before receiving 352 the RRCConnectionSetupComplete message from the UE 102.

As another example, the RRC controller 132 (or another suitable component of the eLTE network) can establish the NR PDCP entity 136 to exchange RRC messages with the UE 102 before transmitting 312 the RRCConnectionRelease message to the UE 102. The RRC controller 132 can apply the default NR PDCP configuration to the NR PDCP entity 136 in response to transmitting 312 the RRCConnectionRelease message to the UE 102 or before receiving 352, 452 the RRCConnectionSetupComplete message from the UE 102. The RRC controller 132 can reestablish the NR PDCP entity 136 before receiving 352 the RRCConnectionSetupComplete message, e.g., in response to transmitting 312 the RRCConnectionRelease message to the UE 102, in response to receiving 322, 422 the RRCConnectionResumeRequest message, or in response to transmitting 324, 424 the RRCConnectionSetup message.

In the implementations discussed above with reference to FIGS. 3 and 4, the UE 102 and the ng-eNB 104 (or the ng-eNB 106) utilize the NR PDCP format to communicate the RRCConnectionSetupComplete message as well as messages related to the one or more subsequent RRC procedures. Alternatively, the UE 102 and the ng-eNB 104 (or the ng-eNB 106) can apply the EUTRA PDCP format to the RRCConnectionSetupComplete message, the messages related to the one or more subsequent RRC procedures, or both.

Figure 5:
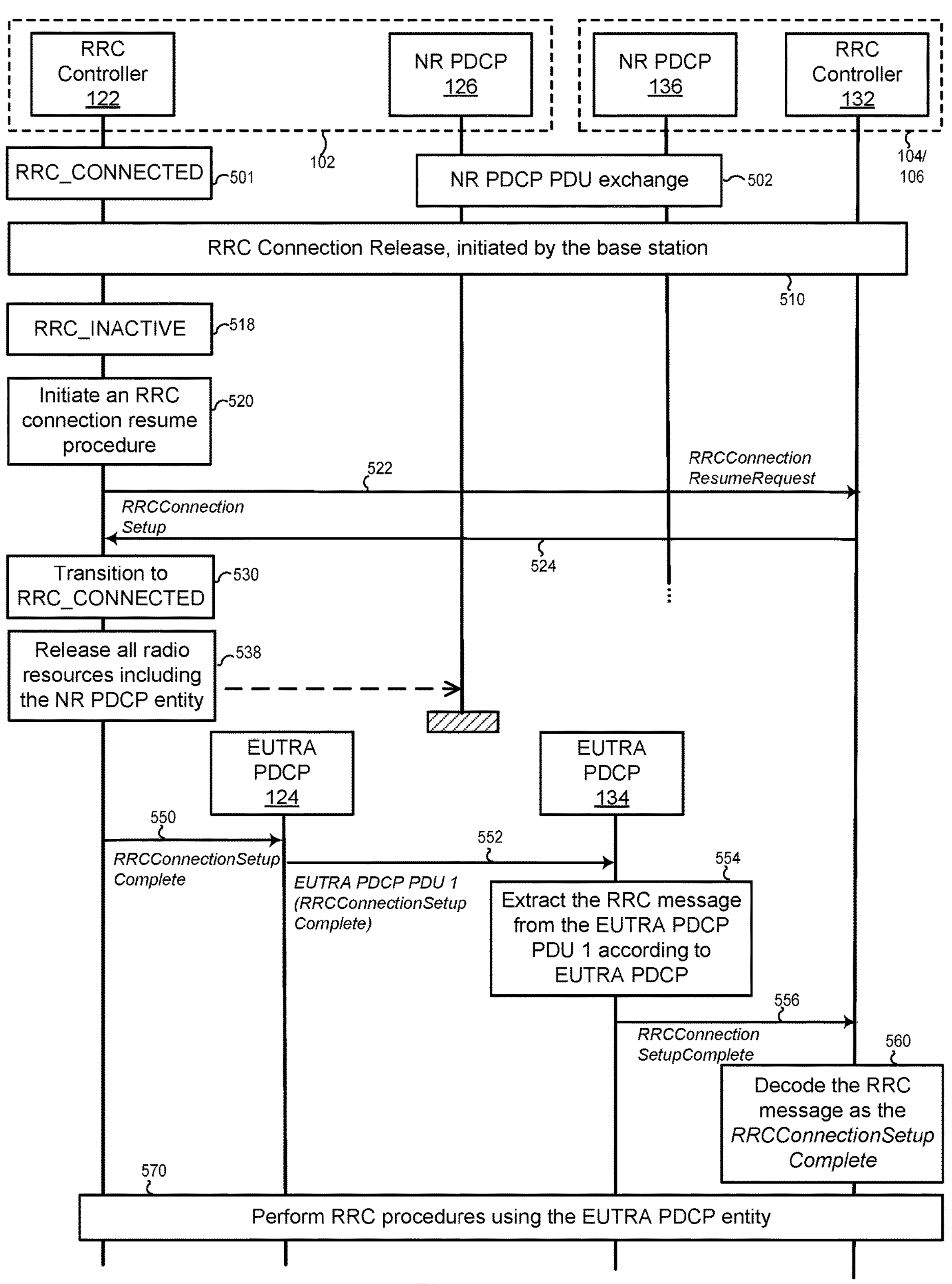
FIG. 5 is a messaging diagram of an example scenario in which a UE exchanges NR PDCP PDUs with an ng-eNB in the RRC_CONNECTED state, and the ng-ENB subsequently decodes the RRCConnectionSetupComplete message from the UE according to the EUTRA PDCP format.

Referring to FIG. 5, events or states 501, 502, 510, 518, 520, 522, 524, and 520 are similar to the events or states 301/401, 302/402, 310/410, 318/418, 320/420, 322/422, 324/424, and 330/430. However, in this scenario, the RRC controller 122 releases 538 all radio resources including the NR PDCP entity 126. The RRC controller 122 then provides 550 the RRCConnectionSetupComplete message to the EUTRA PDCP entity 124, which includes this RRC message in a EUTRA PDCP PDU 1 and transmits 552 the EUTRA PDCP PDU 1 to the ng-eNB 104 (or the ng-eNB 106).

The ng-eNB 104 receives the EUTRA PDCP PDU 1 and extracts 554 the RRCConnectionSetupComplete message from this PDU using the EUTRA PDCP entity 134, in accordance with the EUTRA PDCP format. In contrast to the techniques of FIG. 3, an existing ng-eNB can attempt to extract the RRCConnectionSetupComplete message using an NR PDCP entity, and accordingly using the NR PDCP format. This decoding fails for the reasons discussed above.

The EUTRA PDCP entity 134 then provides 556 the RRCConnectionSetupComplete message to the RRC controller 132, which decodes 560 the RRC message. Thus, in this scenario, the UE 102 transmits, and the ng-eNB 104 decodes, the RRCConnectionSetupComplete message using the same format, namely the EUTRA PDCP format.

After the UE 102 has resumed the RRC connection in the scenario of FIG. 5, the UE 102 and the ng-eNB 104 can perform 570 one or more subsequent procedures (e.g., security mode, DL information, UL information, RRC reconfiguration) using the EUTRA PDCP format to transmit RRC messages and decode received RRC messages. Accordingly, the UE 102 can continue using the EUTRA PDCP entity 124, and the ng-eNB 104 can continue using the EUTRA PDCP entity 134.

Similar to the scenario of FIG. 3, the UE 102 in some implementations sets the SN to zero in the PDCP header of the EUTRA PDCP PDU 1.

In other implementations, UE 102 assigns an initial value (e.g., zero) to the transmit hyper frame number (TX_HFN) and another initial value (which also can be zero) to a next PDCP transmit variable (Next_PDCP_TX_SN) in response to a certain event. Similar to the TX_COUNT variable discussed above, the event can be for example the receiving of the RRCConnectionRelease message, the initiation of the RRC connection resume procedure, the transmission of the RRCConnectionResumeRequest message to the ng-eNB 104, or the receiving of the RRCConnectionSetup message. The UE 102 then uses the TX_HFN and the Next_PDCP_TX_SN to transmit the EUTRA PDCP PDU 1 as well as the subsequent EUTRA PDCP PDUs.

Further, the UE 102 in some implementations uses the TX_HFN and the Next_PDCP_TX_SN to generate a MAC-I of an RRC PDU including the RRCConnectionSetupComplete message, if integrity protection is configured in the RRCConnectionSetup message. The UE can encrypt a PDCP SDU including the RRC PDU and the MAC-I of the RRC PDU message, if encryption is configured in the RRCConnectionSetup message. The UE 102 includes the encrypted PDCP SDU in the EUTRA PDCP PDU 1. The UE 102 sets the SN in the PDCP PDU header of the EUTRA PDCP PDU 1 to the Next_PDCP_TX_SN. The UE 102 then increments the Next_PDCP_TX_SN by 1 after encrypting the PDCP SDU or generating the EUTRA PDCP PDU 1. In other implementations, if neither the integrity protection nor the encryption is configured in the RRCConnectionSetup message, the UE 102 still generates a MAC-I of an RRC PDU including the RRCConnectionSetupComplete message and sets the MAC-I to a default value (e.g., 0). The UE 102 in this implementation generates a PDCP SDU to include the RRC PDU and the MAC-I, includes the PDCP SDU in the NR PDCP PDU 4 and sets the SN in the PDCP PDU header of the NR PDCP PDU 4 to the Next_PDCP_TX_SN.

When the UE 102 needs to transmit the first RRC message after transmitting 552 the RRCConnectionSetupComplete message or after receiving a SecurityModeCommand message from the ng-eNB 104 (or the ng-eNB 106), the UE 102 in some implementations uses the TX_HFN and the Next_PDCP_TX_SN to encrypt a PDCP SDU including an RRC PDU including the first RRC message and including the MAC-I of the RRC PDU. The UE 102 includes the encrypted PDCP SDU in EUTRA PDCP PDU 2. The UE 102 sets the SN in the PDCP PDU header of the EUTRA PDCP PDU 2 to the Next_PDCP_TX_SN. The UE 102 increments the Next_PDCP_TX_SN by 1 after encrypting the PDCP SDU or generating the EUTRA PDCP PDU 2. The UE 102 then transmits the EUTRA PDCP PDU 2 to the ng-eNB 104 (or the ng-eNB 106). The UE 102 can transmit each of the subsequent RRC messages in a similar manner.

Further, the UE 102 in some implementations assigns an initial value (e.g., zero) to a receive count variable HFN (RX_HFN) as well as to a next PDCP receive SN (Next_PDCP_RX_SN), in response to an event similar to the events discussed above with reference to the RX_COUNT variable. The UE 102 then uses the RX_HFN and the Next_PDCP_RX_SN to process received EUTRA PDCP PDUs (e.g., for decryption of a EUTRA PDCP SDU in a received EUTRA PDCP PDU and/or for integrity check on an RRC PDU in the EUTRA PDCP SDU). The UE 102 increments the RX_COUNT value 1 after processing each of the EUTRA PDCP PDUs, which can be Data PDUs for example.

In the implementation corresponding to FIG. 5, the RRC controller 122 can establish the NR PDCP entity 126 for an SRB (e.g., SRB1) prior to receiving 524 the RRCConnectionSetup message, for example. In one implementation, the RRC controller 122 establishes the NR PDCP entity 126 in response to initiating the RRC connection resume procedure or transmitting 522 the RRCConnectionResumeRequest message to the ng-eNB 104. The UE 102 can release the NR PDCP entity 126 in response to the RRCConnectionSetup message.

In another example implementation, the UE 102 establishes the NR PDCP entity 126 before receiving the RRC-ConnectionRelease message from the ng-eNB during the procedure 510. More specifically, the UE 102 can receive the NR PDCP PDU 3, extract the RRCConnectionRelease message from the NR PDCP PDU 3 using the NR PDCP entity 126, and release the NR PDCP entity 126 in response to the RRCConnectionRelease message.

As yet another example, the RRC controller 122 can establish the NR PDCP entity 126 in response to receiving the RRCConnectionRelease message from the ng-eNB 104. The RRC controller 122 in this case can release the NR PDCP entity 126 in response to receiving 524 the RRCConnectionSetup message.

In some implementations, the RRC controller 122 establishes the EUTRA PDCP entity 124 at the same time as releasing the NR PDCP entity 126. In particular, the RRC controller 122 can establish the EUTRA PDCP entity 124 in response to receiving 524 the RRCConnectionSetup message.

Figure 6:
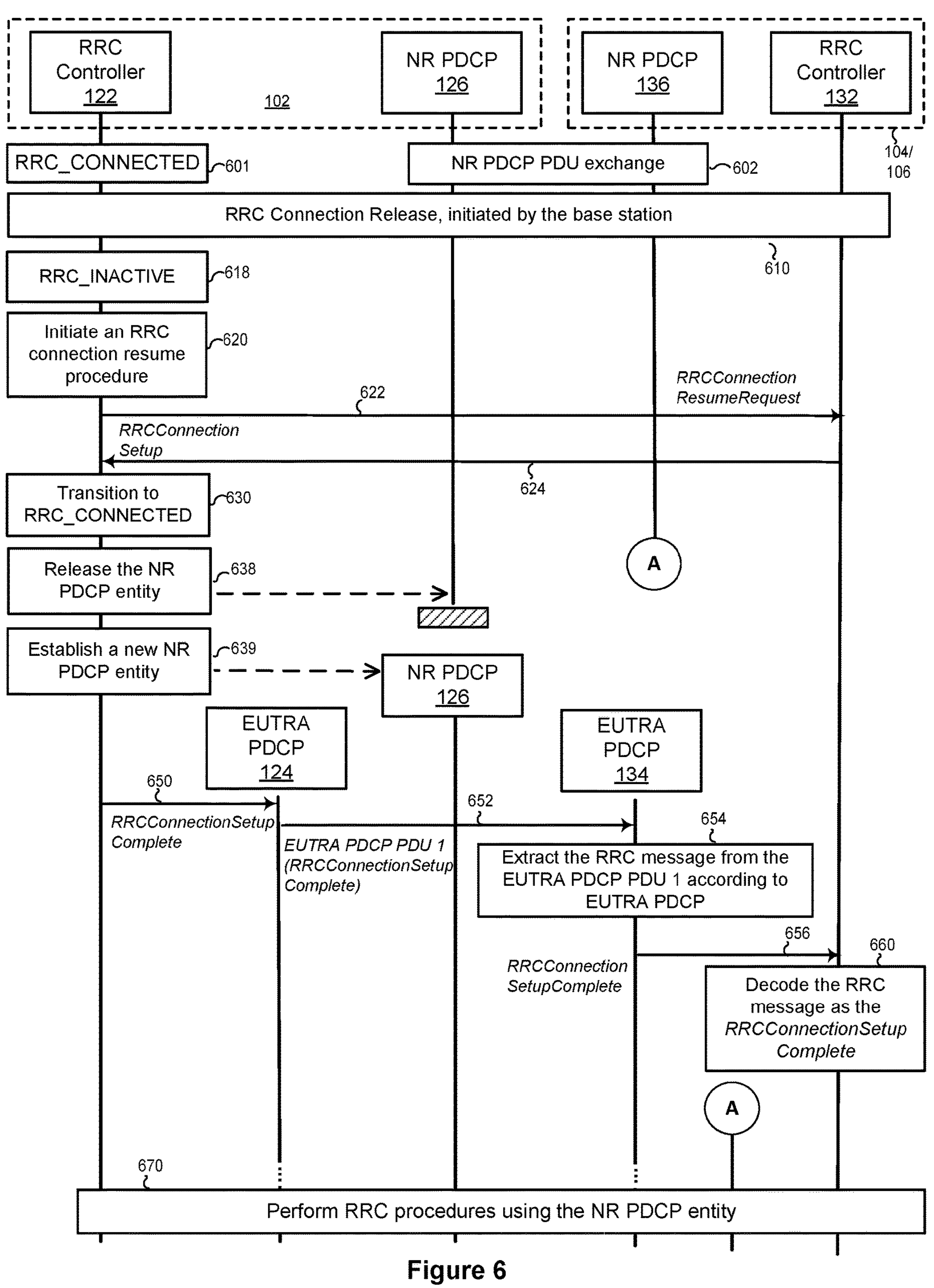
FIG. 6 is a messaging diagram of an example scenario in which a UE exchanges NR PDCP PDUs with an ng-eNB in the RRC_CONNECTED state, transmits the RRCConnectionSetupComplete message to the ng-eNB in the EUTRA PDCP format, and exchanges EUTRA PDCP PDUs with the ng-eNB to perform another RRC procedure.

Now referring to FIG. 6, the UE 102 and the ng-eNB 104 (or the ng-eNB 106) in this scenario utilize the EUTRA PDCP format to communicate the RRCConnectionSetupComplete message, similar to the scenario of FIG. 5. However, here the UE 102 and the ng-eNB 104 (or the ng-eNB 106) utilize the NR PDCP format to communicate RRC messages during one or more subsequent procedures.

More specifically, events or states 601, 602, 610, 618, 620, 622, 624, 620, and 630 are similar to the events or states 301/401/501, 302/402/502, 310/410/510, 318/418/518, 320/420/520, 322/422/522, 324/424/524, and 330/430/530. After the RRC controller 122 transitions 530 to the RRC_CONNECTED state, the RRC controller 122 establishes 639 a new instance of the NR PDCP entity 126.

The RRC controller 122 then provides 650 the RRCConnectionSetupComplete message to the EUTRA PDCP entity 124. Depending on the implementation, the RRC controller 122 can establish the EUTRA PDCP entity 124 after receiving 624 the RRCConnectionSetup message, or the RRC controller 122 continues to utilize an instance of the EUTRA PDCP entity 124 established earlier (e.g., prior to the exchange 602). The EUTRA PDCP entity 124 includes the RRCConnectionSetup message in a EUTRA PDCP PDU 1 and transmits 652 the EUTRA PDCP PDU 1 to the ng-eNB 104. The ng-eNB 104 then receives the EUTRA PDCP PDU 1, extracts 654 the RRCConnectionSetupComplete message from this PDU using the EUTRA PDCP entity 134 in accordance with the EUTRA PDCP format, and provides 656 the RRCConnectionSetupComplete message to the RRC controller 132, which in turn decodes 660 the RRC message. Similar to the scenario of FIG. 5, the UE 102 transmits, and the ng-eNB 104 (or the ng-eNB 106) decodes, the RRCConnectionSetupComplete message using the EUTRA PDCP format.

However, the NR PDCP entity 126 of the UE 102 then can exchange 670 RRC messages related to a subsequent RRC procedure (e.g., security mode, DL information, UL information, RRC reconfiguration) with the NR PDCP entity 136 of the ng-eNB 104 (or the ng-eNB 106), using the NR PDCP format. Thus, in this implementation, the UE 102 and ng-eNB 104 (or the ng-eNB 106) initially exchange PDCP PDUs using the NR PDCP format, use the EUTRA PDCP format to resume the RRC connection, and continue using the NR PDCP format for a subsequent RRC procedure. The UE 102 can apply a default NR PDCP configuration to the NR PDCP entity 126 as described previously. The UE 102 can apply an NR PDCP configuration to the NR PDCP entity 126 as described previously if the RRCConnectionSetup message includes the NR PDCP configuration, as described previously. The ng-eNB 104 (or the ng-eNB 106) can apply a default NR PDCP configuration to the NR PDCP entity 136 as described previously. The ng-eNB 104 (or the ng-eNB 106) can apply a NR PDCP configuration to the NR PDCP entity 136 as described previously if the RRCConnectionSetup message includes the NR PDCP configuration, as described previously.

To manage the PDU count, the UE 102 in this implementation can use both the TX_COUNT technique discussed above with reference to FIG. 3 and the TX_HFN and Next_PDCP_TX_SN technique discussed above with reference to FIG. 5. More specifically, the UE 102 can apply the TX_COUNT technique to outbound NR PDCP PDUs and the TX_HFN/Next_PDCP_TX_SN technique to outbound EUTRA PDCP PDUs. The UE 102 also can utilize the RX_COUNT technique discussed above to process received NR PDUs. Because the UE 102 does not receive EUTRA PDCP PDUs from the ng-eNB 104 in this scenario, the UE 102 need not implement an RX_COUNT technique for EUTRA PDCP PDUs.

Referring generally to FIGS. 3-6, the UE 102 and the eLTE network in which the ng-eNB 104 operates can communicate the PDCP PDUs discussed above using EUTRA RLC PDUs with teach other. As illustrated in FIG. 2B, on the control plane, the EUTRA PDCP sublayer 218 and the NR PDCP sublayer 208 are layered over the RLC sublayer 206. In some implementations, the UE 102 establishes a EUTRA RLC entity (not shown in any of the drawings to avoid clutter) for the SRB (e.g., SRB1) in response to the RRCConnectionSetup message, in response to initiating the RRC connection resume procedure, or in response to transmitting an RRCConnectionResumeRequest message. Similarly, the ng-eNB 104 can establish a EUTRA RLC entity for the SRB (also omitted in the drawings above to avoid clutter) in response to receiving the RRCConnectionResumeRequest message, for example. The EUTRA RLC entity of the UE 102 and the EUTRA RLC entity of the ng-eNB 104 can use EUTRA RLC PDUs to transmit and receive NR PDCP PDUs and/or EUTRA PDCP PDUs.

Figure 7:
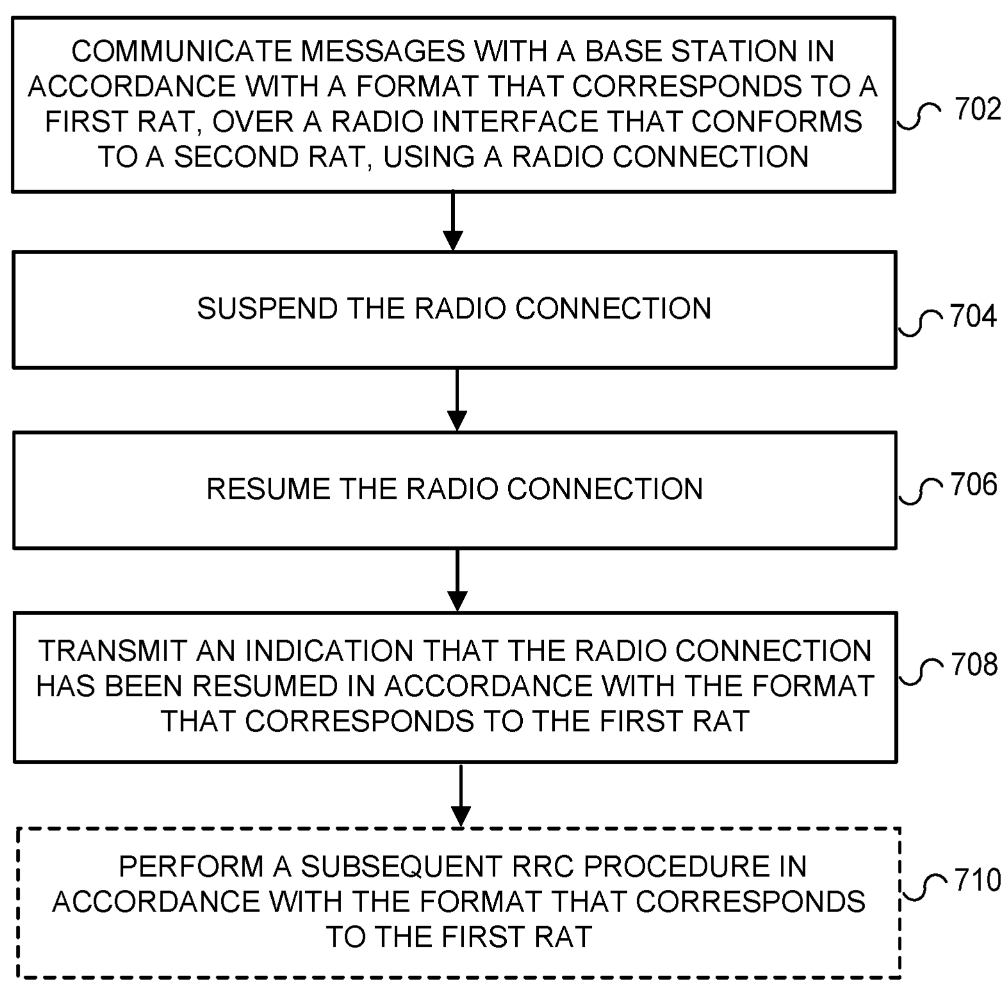
FIG. 7 is a flow diagram of an example method in a user device for transmitting an indication that the radio connection has been resumed, which can be implemented in the system of FIG. 1.

FIG. 7 is a flow diagram of an example method 700 for transmitting an indication that the radio connection has been resumed. The method 700 can be implemented in the UE 102, and is discussed below with reference to the UE 102. However, the method 700 in general can be implemented in any suitable device.

At block 702, the UE 102 communicates messages with a base station, such as the ng-eNB 104, in accordance with a format that corresponds to a first RAT. For example, the first RAT can be NR, and the messages can conform to the NR PDCP format. The UE 102 communicates these messages at block 702 using a radio connection (e.g., an RRC connection) over the radio interface that conforms to a different, second RAT. For example, the second RAT can be EUTRA. Examples of communicating messages in accordance with the NR format over a EUTRA radio interface include the exchanges 302, 402, 502, and 604. The UE 102 at block 702 can operate in the RRC_CONNECTED state (see state 301 in FIG. 3, state 401 in FIG. 4, state 501 in FIG. 5, and state 601 in FIG. 6).

At block 704, the UE 102 can suspend the radio connection. The UE 102 for example can transition to the RRC_INACTIVE state (events 318 in FIG. 3, 418 in FIG. 4, 518 in FIG. 5, and 618 in FIG. 6). This suspension can be due to receiving an RRCConnectionRelease message (e.g., event 312 in FIG. 3), which in turn can be due to a certain period of data inactivity at the UE 102.

Next, at block 706, the UE 102 can resume the radio connection (e.g., events 320 in FIG. 3, 420 in FIG. 4, 520 in FIG. 5, and 620 in FIG. 6). For example, the RRC controller 122 can receive an indication that outbound data is available for transmission to the ng-eNB 104 or another base station.

At block 708, the UE 102 transmits an indication that the radio connection has been resumed (e.g., event 352 in FIG. 3 and event 452 in FIG. 4). The indication can be an RRCConnectionSetupComplete message. The UE 102 uses the format that corresponds to the first RAT. To continue with the example above, the format that corresponds to the first RAT can be NR PDCP. As discussed above, the ng-eNB 104 can decode this RRC message using the NR PDCP entity.

Optionally, the UE 102 at block 710 can perform at least one subsequent RRC procedure in accordance with the format that corresponds to the first RAT (e.g., event 370 in FIG. 3 and event 470 in FIG. 4).

Figure 8:
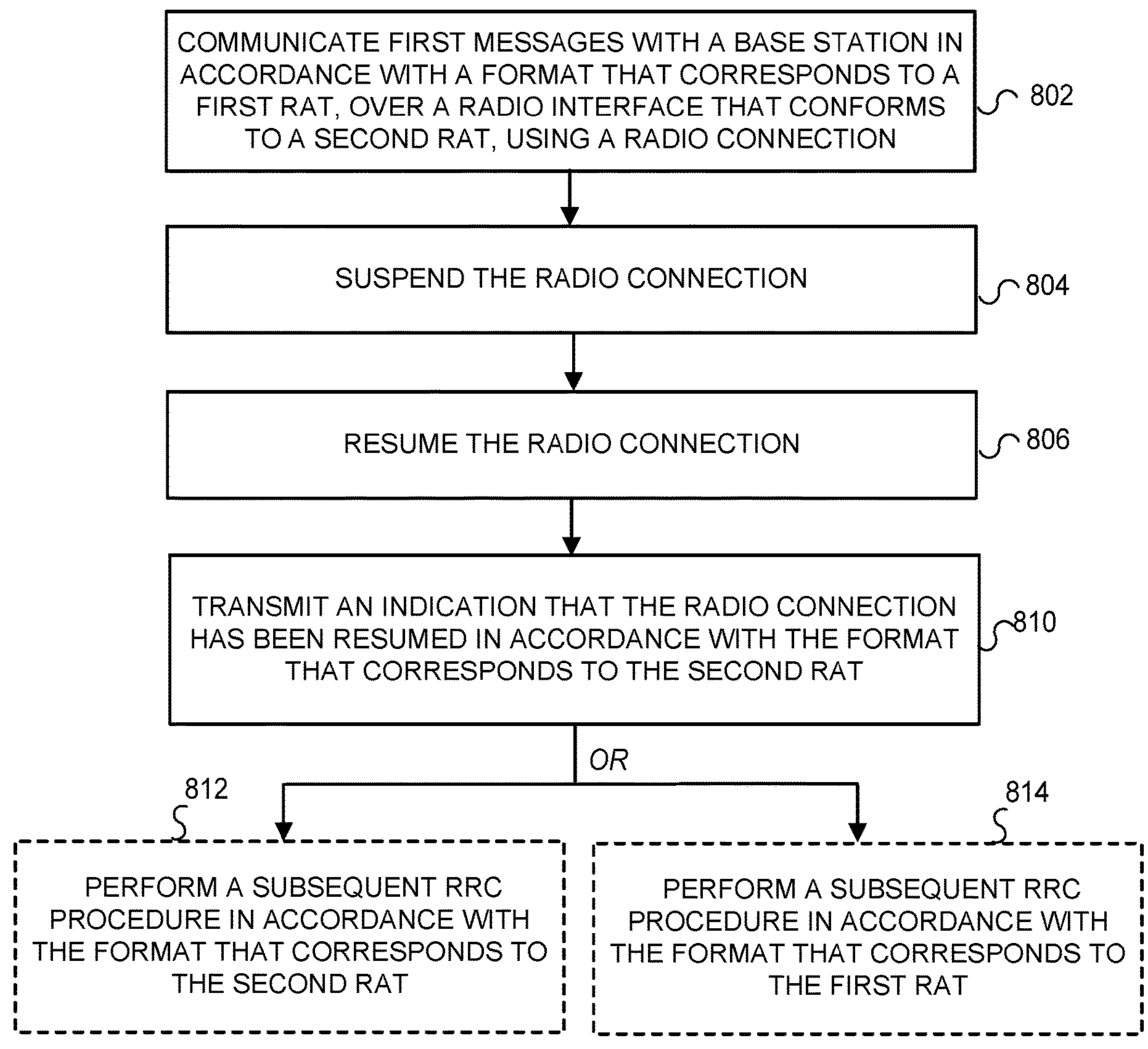
FIG. 8 is a flow diagram of another example method in a user device for transmitting an indication that the radio connection has been resumed, which can be implemented in the system of FIG. 1.

FIG. 8 is a flow diagram of another example method 800 for transmitting an indication that the radio connection has been resumed. The method 800 also can be implemented in the UE 102, and is discussed below with example reference to the UE 102.

Blocks 802, 804, and 806 of the method 800 are similar to blocks 702, 704, and 706 of the method 700. However, at block 810, the UE 102 transmits an indication that the radio connection has been resumed (e.g., event 552 in FIG. 5 and event 652 in FIG. 4). The indication can be an RRCConnectionSetupComplete message, similar to the method 700, but according to this method the UE 102 uses the format that corresponds to the second RAT. To continue with the example above, the format that corresponds to the second RAT can be EUTRA PDCP. As discussed above, the ng-eNB 104 can decode this RRC message using the EUTRA PDCP entity.

The method 800 can include an optional block 812 or an optional block 814. At block 812, the UE 102 performs a subsequent RRC procedure in accordance with the format that corresponds to the second RAT, which in the example above is EUTRA (e.g., event 570 in FIG. 5). On the other hand, at block 814, the UE 102 performs a subsequent RRC procedure in accordance with the format that corresponds to the first RAT, which in the example above is NR (e.g., event 670 in FIG. 6).

Figure 9:
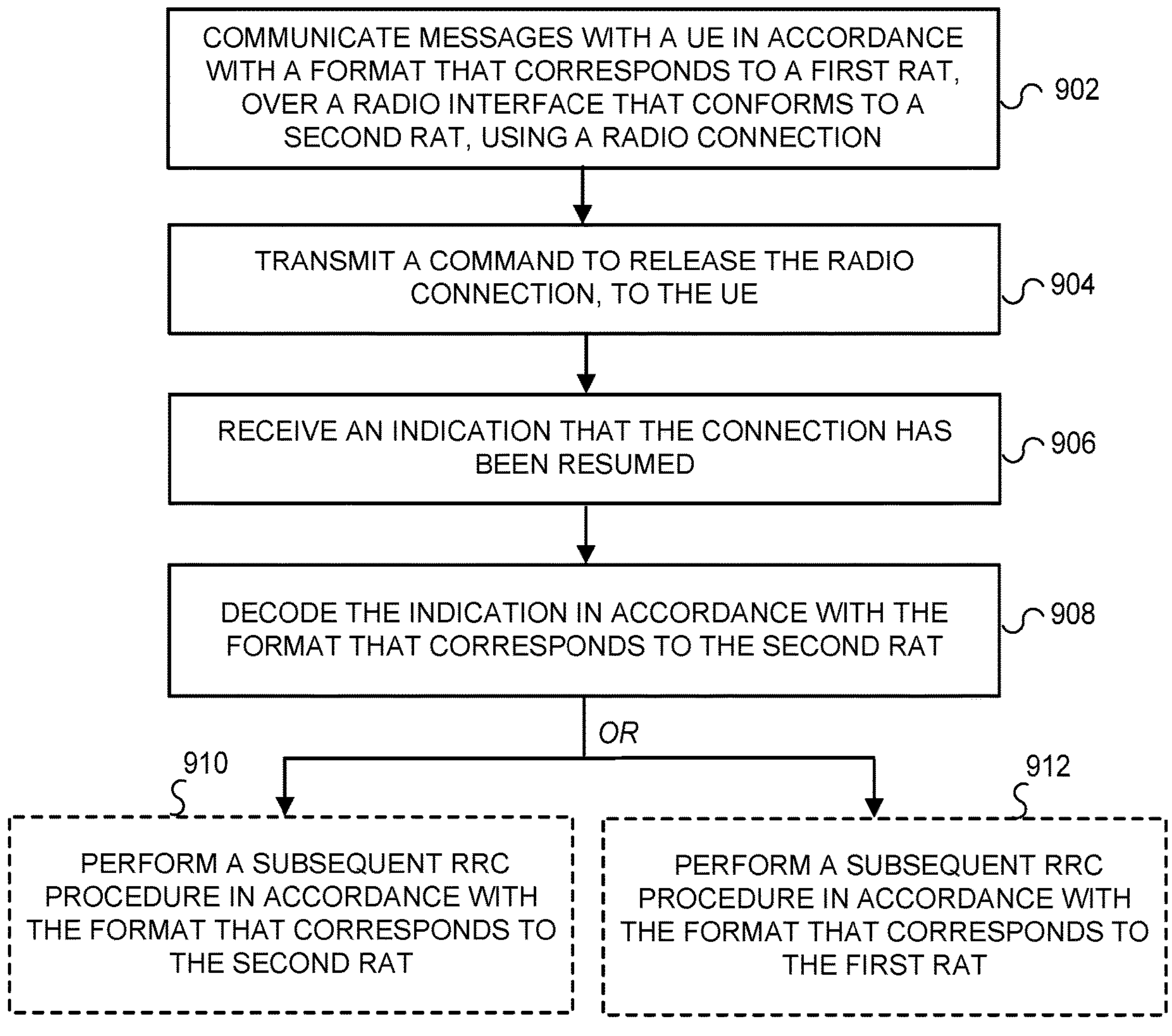
FIG. 9 is a flow diagram of an example method in a base station for decoding an indication that the radio connection has been resumed, which can be implemented in the system of FIG. 1.

Next, FIG. 9 illustrates an example method 900 for decoding an indication that the radio connection has been resumed. The method 900 can be implemented in any suitable base station, and is discussed below with example reference to the ng-eNB 104.

At block 902, the ng-eNB 104 communicates messages with a UE, such as the UE 102, in accordance with a format that corresponds to a first RAT. For example, the first RAT can be NR, and the messages can conform to the NR PDCP format. The ng-eNB 104 communicates these messages at block 902 using a radio connection (e.g., an RRC connection) over the radio interface that conforms to a different, second RAT. For example, the second RAT can be EUTRA. Examples of communicating messages in accordance with the NR PDCP format over a EUTRA radio interface include the exchanges 302, 402, 502, and 604.

At block 904, the ng-eNB 104 can transmit a command to the UE 102 to suspend the radio connection, e.g., the RRC connection (e.g., event 312 of FIG. 3). The ng-eNB 104 can transmit this command in response to detecting a period of inactivity, for example.

At block 906, the ng-eNB 104 can receive an indication that the radio connection has been resumed. Examples of this indication include the events 352, 422, 522, and 622 of FIGS. 3-6.

At block 908, according to the method 900, the ng-eNB 104 decodes the indication in accordance with the format that corresponds to the second RAT, e.g., EUTRA (e.g., event 554 of FIG. 5 and event 654 of FIG. 6). More specifically, the ng-eNB 104 can use a PDCP entity that corresponds to the second RAT and processes PDUs in accordance with the format of the second RAT.

The method 900 can include an optional block 910 or an optional block 912. At block 912, the ng-eNB 104 performs a subsequent RRC procedure in accordance with the format that corresponds to the second RAT, which in the example above is EUTRA (e.g., event 570 in FIG. 5). On the other hand, at block 912, the ng-eNB 104 performs a subsequent RRC procedure in accordance with the format that corresponds to the first RAT, which in the example above is NR (e.g., event 670 in FIG. 6).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for resuming RRC connections through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The following list of aspects reflects a variety of the embodiments explicitly contemplated by the present disclosure.

Aspect 1. A method in a user equipment (UE) for resuming a connection with a base station can be executed by processing hardware. The method includes communicating first messages with the base station in accordance with a first format that corresponds to a first RAT, using a radio connection over a radio interface that conforms to a second RAT. The method further includes suspending the radio connection; and subsequently to the suspending: (i) transmitting, to the base station, an indication that the radio connection has been resumed, in accordance with a second format that corresponds to the second RAT, and (ii) communicating second messages of a procedure for controlling radio resources, in accordance with the first format or the second format.

Aspect 2. The method of aspect 1, including transmitting the second messages in accordance with the first format.

Aspect 3. The method of aspect 1, including transmitting the second messages in accordance with the second format.

Aspect 4. The method of aspect 1, further comprising: establishing a first entity for communicating with the base station using the first format; and when the radio connection has been resumed: (i) releasing the first entity, and (ii) establishing a second entity for communicating with the base station using the second format.

Aspect 5. The method of any of aspects 1-4, where the first format is NR PDCP, and the second format is EUTRA PDCP.

Aspect 6. The method any of aspects 1-5, where transmitting the indication that the radio connection has been resumed includes transmitting an RRC message.

Aspect 7. The method of any of aspects 1-6, wherein the procedure is one of: (i) a security mode procedure to activate access stratum security, (ii) a downlink (DL) information procedure, (iii) an uplink (UL) information procedure, (iv) a connection reconfiguration procedure, or (v) a measurement reporting procedure.

Aspect 8. The method of any of aspects 1-7, wherein transmitting the indication includes setting a counter in a header of a data unit that includes the indication to zero.

Aspect 9. A UE comprising processing hardware configured to implement a method of any of the preceding aspects.

Aspect 10. A method in a base station for resuming a connection with a UE can be executed by processing hardware and includes: communicating messages with the UE in accordance with a format that corresponds to a first RAT, using a radio connection over a radio interface that conforms to a second RAT; transmitting, to the UE, a command to release the radio connection; subsequently to the transmitting, receiving, by the processing hardware from the UE, an indication that the connection has been resumed; and decoding the indication in accordance with the format that corresponds to the first RAT.

Aspect 11. The method of aspect 10, where the format is a first format, the method further comprising, subsequently to receiving the indication: communicating messages of a procedure related to controlling radio resources, in accordance with a second format that corresponds to the second RAT.

Aspect 12. The method of aspect 10, further comprising, subsequently to receiving the indication: communicating, by the processing hardware with UE, messages of a procedure to controlling radio resources, in accordance with the format that corresponds to the first RAT.

Aspect 13. The method of aspect 10 or 11, where the procedure is one of: (i) a security mode procedure to activate access stratum security, (ii) a downlink (DL) information procedure, (iii) an uplink (UL) information procedure, (iv) a connection reconfiguration procedure, or (v) a measurement reporting procedure.

Aspect 14. The method of aspect 10, where the format is associated with a first protocol sublayer that provides radio bearers to a second protocol sublayer at which the UE and the base station communicate messages related to controlling radio resources.

Aspect 15. The method of aspect 14, wherein the first protocol sublayer is the PDCP protocol, and wherein the second protocol sublayer is the RRC protocol.

Aspect 16. A base station comprising processing hardware configured to execute a method according to any of aspects 10-15.

What is claimed is:

1. A user equipment (UE) comprising processing hardware and configured to:

communicate, in an RRC_CONNECTED state, messages with a base station and in accordance with Packet Data Convergence Protocol (PDCP) protocol that corresponds to a first radio access technology (RAT), using a radio connection over a radio interface that conforms to a second RAT;

suspend the radio connection to transition to an RRC_INACTIVE state;

subsequently to the suspending, transmit, to the base station over the radio interface that conforms to the second RAT, an indication that the radio connection has been resumed from the RRC_INACTIVE state to the RRC_CONNECTED state, in accordance with the PDCP protocol that corresponds to the first RAT; and subsequently to the transmitting, communicate, with the base station, RRC messages associated with an uplink (UL) information procedure, in accordance with the PDCP protocol that corresponds to the first RAT.

2. The UE of claim 1, wherein the UE is further configured to:

establish an entity for communicating with the base station in accordance with the PDCP protocol that corresponds to the first RAT;

wherein communicating the messages and transmitting the indication includes using the entity.

3. The UE of claim 1, further configured to:

receive, from the base station, a command to release the radio connection;

wherein the suspending of the radio connection is in response to receiving the command.

4. The UE of claim 1, further configured to:

transmit, to the base station, a request to resume the radio connection;

receive, from the base station, a command to set up the radio connection; and resume the radio connection in response to the receiving the command.

5. The UE of claim 1, wherein to transmit the indication, the UE is configured to:

set a counter in a header of a data unit that includes the indication to zero.

6. The UE of claim 5, further configured to, subsequently to the suspending:

transmit messages to the base station in accordance with the PDCP protocol that corresponds to the first RAT, including:

increment the counter for each of the messages, and include the counter in headers of respective data units that include the messages.

7. The UE of claim 1, wherein:

the first RAT is 5G NR; and the second RAT is EUTRA.

8. The UE of claim 1, further configured to:

subsequently to the suspending, apply a default configuration associated PDCP protocol of the first RAT.

9. The UE of claim 1, wherein:

the indication that the radio connection has been resumed includes an RRCConnectionSetupComplete message.

10. The UE of claim 1, further configured to:

determine that outbound data is available for transmission to the base station;

wherein the transmitting of the indication that the radio connection has been resumed is in response to the determining.

11. A user equipment (UE) comprising processing hardware and configured to:

establish a first entity for communicating with a base station in accordance with a format that corresponds to a first radio access technology (RAT);

communicate, in an RRC_CONNECTED state and using the first entity, messages with the base station and in accordance with a format that corresponds to the first RAT, using a radio connection over a radio interface that conforms to a second RAT;

suspend the radio connection to transition to an RRC_INACTIVE state;

release the first entity;

establish a second entity for communicating with the base station in accordance with the format that corresponds to the first RAT; and subsequently to the suspending, transmit, to the base station over the radio interface that conforms to the second RAT and using the second entity, an indication that the radio connection has been resumed, in accordance with the format that corresponds to the first RAT, to the RRC_CONNECTED STATE.

12. The UE of claim 11, wherein the indication is associated with a procedure that is one of:

(i) a security mode procedure to activate access stratum security, (ii) a downlink (DL) information procedure, (iii) an uplink (UL) information procedure, (iv) a connection reconfiguration procedure, or (v) a measurement reporting procedure.

13. The UE of claim 11, further configured to:

receive, from the base station, a command to release the radio connection;

wherein the suspending of the radio connection is in response to receiving the command.

14. The UE of claim 11, further configured to:

transmit, to the base station, a request to resume the radio connection;

receive, from the base station, a command to set up the radio connection; and resume the radio connection in response to the receiving the command.

15. A user equipment (UE) comprising processing hardware and configured to:

communicate, in an RRC_CONNECTED state, messages with a base station and in accordance with a format that corresponds to a first radio access technology (RAT), using a radio connection over a radio interface that conforms to a second RAT;

suspend the radio connection to transition to an RRC_INACTIVE state; and subsequently to the suspending, transmit, to the base station over the radio interface that conforms to the second RAT, an indication that the radio connection has been resumed, in accordance with the format that corresponds to the first RAT, to the RRC_CONNECTED STATE; and use a Packet Data Convergence Protocol (PDCP) protocol of the first RAT to communicate messages with the base station messages via a signaling radio bearer 1 (SRB1).

16. The UE of claim 15, further configured to:

receive, from the base station, a command to release the radio connection;

wherein the suspending of the radio connection is in response to receiving the command.

17. The UE of claim 15, further configured to:

subsequently to the suspending, apply a default configuration associated with a Packet Data Convergence Protocol (PDCP) protocol of the first RAT.

18. The UE of claim 15, further configured to:

determine that outbound data is available for transmission to the base station;

wherein the transmitting of the indication that the radio connection has been resumed is in response to the determining.

* * * * *